United States Patent [19]
Poltorak

[11] 3,973,812
[45] Aug. 10, 1976

[54] BICYCLE STORAGE LOCKER
[76] Inventor: Henry Poltorak, 350 N. Sierra Bonita, Los Angeles, Calif. 90036
[22] Filed: Mar. 21, 1975
[21] Appl. No.: 560,631

[52] U.S. Cl. ................................ 312/100; 52/82; 211/17
[51] Int. Cl.² ........................................ A47B 81/00
[58] Field of Search ............... 312/216, 100, 244 X; 52/65, 66, 82; 292/37, 41; 211/17 X

[56] References Cited
UNITED STATES PATENTS

| | | |
|---|---|---|
| 621,819 | 3/1899 | Ivatt .................................. 211/17 |
| 636,324 | 11/1899 | Ehrenberg ...................... 211/17 X |
| 1,039,255 | 9/1912 | Clarke ................................. 52/65 |
| 2,544,234 | 3/1951 | Magnesi ........................... 312/100 |
| 2,796,628 | 6/1957 | Van Meter .......................... 292/37 |
| 2,905,493 | 9/1959 | Tocchetto ........................... 292/37 |
| 3,714,746 | 2/1973 | Barlow ................................. 52/66 |

FOREIGN PATENTS OR APPLICATIONS 155,887  3/1937  Germany .............................. 24/17

Primary Examiner—Kenneth Downey
Attorney, Agent, or Firm—Don B. Finkelstein

[57] ABSTRACT

A vertically aligned triangularly cross sectioned bicycle storage cabinet having a pyramidical top and in which the bicycle is vertically suspended in the storage cabinet from a hook mounted at the apex of the pyramidical top by engagement with the front or back wheel of the bicycle. The base of the triangularly cross sectioned storage cabinet is provided with a door and lock means are provided for locking the door in a closed position.

8 Claims, 5 Drawing Figures

U.S. Patent  Aug. 10, 1976  3,973,812
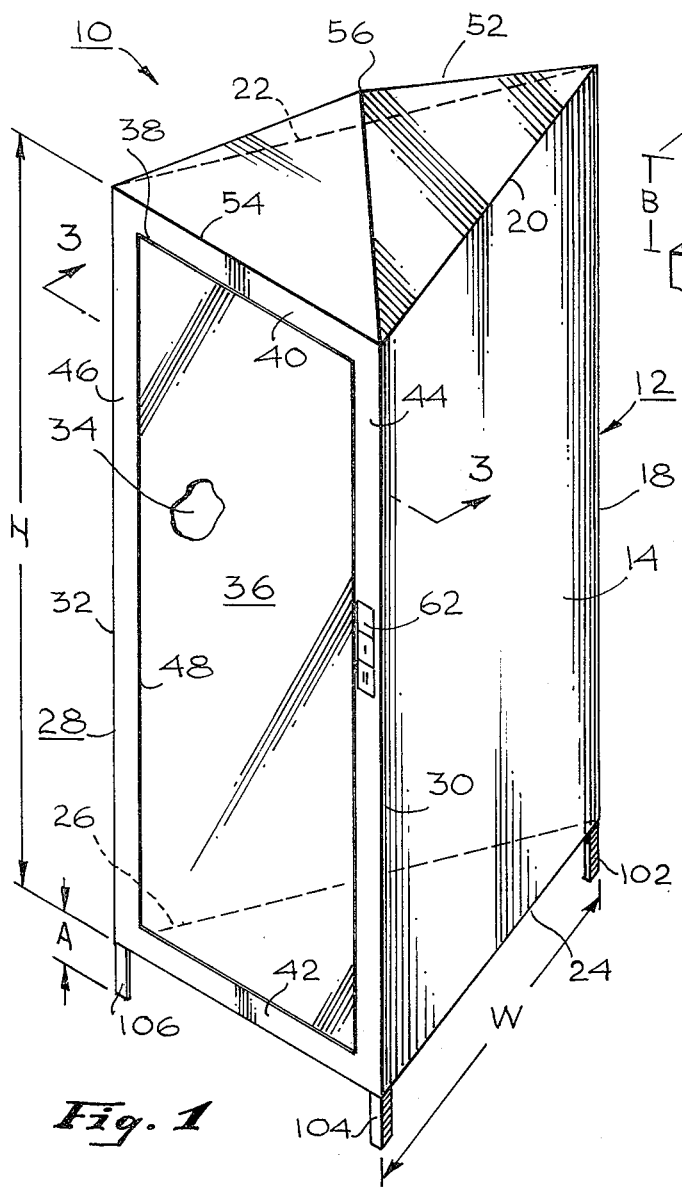
Fig. 1
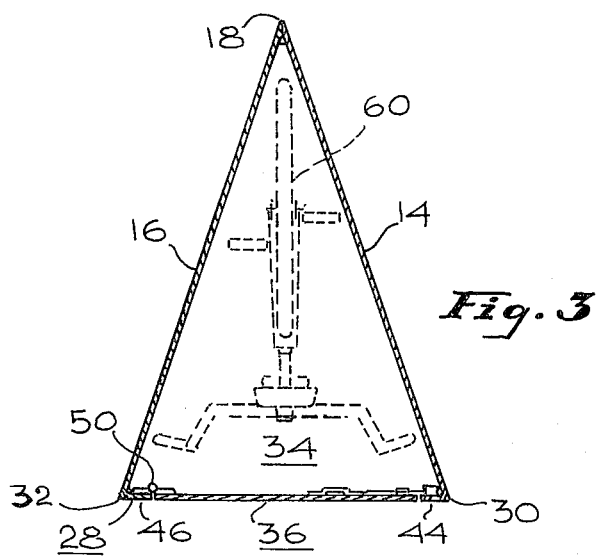
Fig. 3
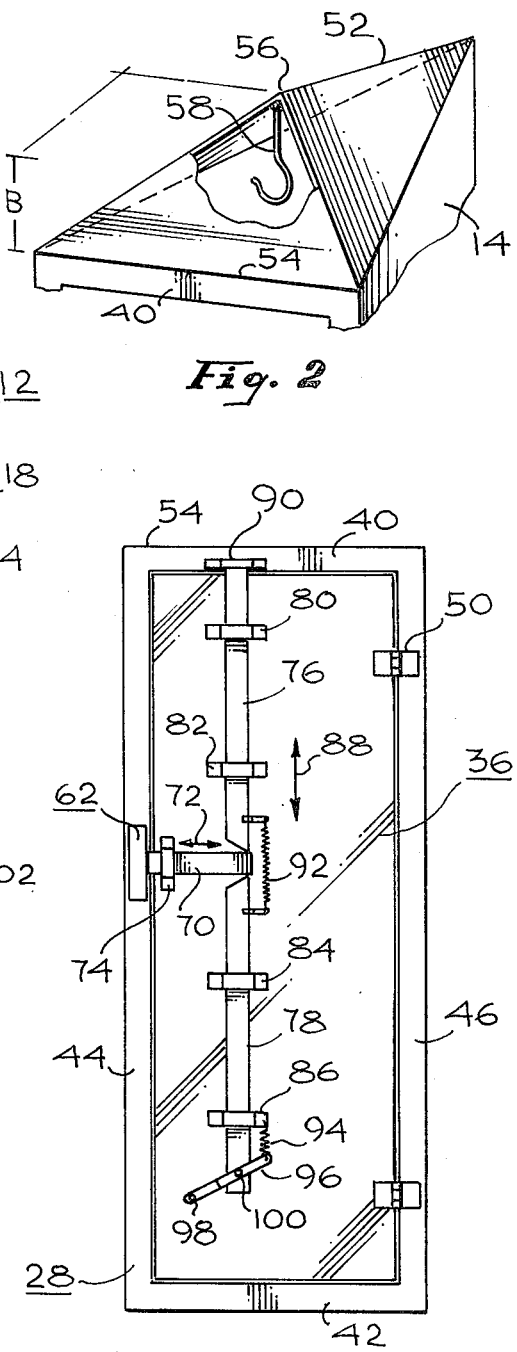
Fig. 2
Fig. 4
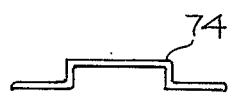
Fig. 5

BICYCLE STORAGE LOCKER

BACKGROUND OF THE INVENTION

1. Field of the Invention

This invention relates to the storage cabinet art and, more particularly, to an improved bicycle storage cabinet.

2. Description of the Prior Art

The popularity of bicycles as a means of basic transportation and utilization by people of all ages has increased dramatically. Such utilization of bicycles has proven to be not only a healthful form of exercise for the individual, but also a nonpolluting means of transportation. However, one drawback to even greater utilization of the bicycle has been the concomitant, dramatic increase in bicycle thefts accompanying the increased utilization of bicycles. That is, when the bicycle rider leaves his bicycle unattended, such as at a store, market, theater, or the like, bicycles are frequently stolen while they are out of view of the owner thereof.

Chains, cables, bar locks, and the like are often utilized in an attempt to prevent such thefts. However, such locking devices, in general, merely lock, for example, the rear wheel of the bicycle to the frame of the bicycle. This type of locking arrangement has proven to be unsatisfactory, since bolt cutters or the like frequently carried by bicycle thieves and such chains or cables are cut by the bolt cutter and the bicycle then stolen. The same result is also achieved when similar locking devices are utilized to lock the bicycle to a stationary object such as a tree, post, or the like. Additionally, portions of the bicycle such as saddles, wheels, seat posts, handlebars, cranks, and the like, as well as accessories such as light and generator sets, saddle bags, bicycle pumps, stamina bottles, and the like, are frequently stolen, even though the above mentioned type of chain or cable locking prevented theft of the frame and/or the frame and wheel. This has been found to be particularly true with the increase in utilization of comparatively high cost 10 speed bicycles with precision components thereon wherein, for example, a pair of brakes for the front and rear wheels may have a retail cost in excess of $100.00.

Noise emitting alarms and other devices have also been proposed, but have not achieved satisfaction since they did not prevent the above mentioned types of thefts of the entire bicycle or only a portion thereof.

Thus, there has been a need for a storage cabinet arrangement in which the entire bicycle may be securely locked to prevent not only theft of the entire bicycle itself, but any of the components thereof or accessories mounted thereon. One type of storage cabinet that has been proposed has been a substantially horizontally aligned storage cabinet in which the bicycle is placed into the cabinet through a door and the cabinet locked. The comparatively large ground area necessary to allow installation of a significant number of such storage cabinets has deterred merchants and others from utilizing their valuable ground space for such storage cabinets. Additionally, such storage cabinets, in resting on the ground and being totally enclosed, offer the further disadvantage of being "death traps" for children or others who may, through play or inadvertence, become locked or trapped therein. The disadvantages of this type of structure have precluded the widespread utilization of such a bicycle storage locker.

Prior art patents such as U.S. Pat. Nos. 621819, 3782559, 3827773, 1033,711, 1393224 and 1713661 do not solve the above mentioned problems or provide the advantages of the present invention. Nor do such structures as those heretofore available on the market such as the bicycle storage cabinet sold by Bike Lockers, Inc., Walnut Creek, California.

Thus, there has long been a need for a bicycle storage cabinet suitable for installation at markets, theaters, stores, shopping centers, and other commercial establishments wherein a bicycle may be securely locked but which does not occupy a large amount of ground therein.

Additionally, such a locker should also have, for example, an open bottom to prevent such lockers from becoming death traps for children or others as well as a clearance space above the ground to allow normal cleaning and maintenance to be done thereunder. Further, in order to minimize the structure needed to fabricate such a locker, it should be configured with the minimum area of peripheral walls in order to conserve such structural materials.

SUMMARY OF THE INVENTION

Accordingly, it is an object of the present invention to provide an improved storage cabinet arrangement.

It is another object of the present invention to provide an improved storage cabinet for the storage of bicycles, motorcycles, or the like.

It is yet another object of the present invention to provide such a bicycle storage cabinet that occupies the minimum amount of ground space, utilizes a minimum of structural material for the fabrication thereof and cannot become a death trap for children or others.

The above and other objects of the present invention are achieved, according to a preferred embodiment of the present invention by providing a vertically extending case means having a pair of substantially planar side members intersecting at a first edge. The first edge extends in a vertical direction and the side members are preferably of the same horizontal width. The case means also is provided with a base members coupled to second edges of the pair of side members to define therewith a substantially isosceles triangularly shaped bicycle storage cavity extending a pre-determined vertical distance from the ground. The base member is provided with a hinged door means to define a bicycle accepting aperture therethrough so the bicycle may be placed through the aperture and into the bicycle storage cavity.

The case means is open at the bottom and is supported on legs a pre-determined distance above the ground, for example, on the order of 2 to 5 inches. The open bottom prevents the storage cabinet from becoming a death trap and the above ground spacing allows easy maintenance of the ground underneath the storage cabinet.

The top of the case means is covered with a pyramidical shaped top member having a hook dependent from the apex thereof and into the bicycle storage cavity. A lock means is provided on the case means for selective locking engagement with the door means to secure the door thereto and prevent unauthorized opening thereof.

The bicycle, motorcycle or similar structure that is to be stored within the storage cavity is suspended from the hook by either the front wheel or rear wheel and thus hangs in the storage cabinet in a vertical alignment.

BRIEF DESCRIPTION OF THE DRAWINGS

The above and other advantages of the present invention may be more fully understood from the following detailed description, taken together with the accompanying drawings wherein similar reference characters refer to similar elements throughout and in which:

FIG. 1 is a pictorial representation of one embodiment of the present invention;

FIG. 2 is a pictorial representation of the top thereof;

FIG. 3 is a sectional view along the line 3—3 of FIG. 1;

FIG. 4 illustrates a locking arrangement useful in the practice of the present invention; and FIG. 5 illustrates a component useful in the practice of the present invention.

DESCRIPTION OF THE PREFERRED EMBODIMENTS

Referring now to the drawing there is shown in FIG. 1 an embodiment, generally designated 10, of the present invention in which there is provided a case means generally designated 12 having a pair of side members 14 and 16 coupled together along a vertically extending edge 18. In the preferred embodiment of the present invention the width W of the side members 14 and 16 are substantially equal. Each of the side members 14 and 16 have top edges 20 and 22, respectively, and bottom edges 24 and 26, respectively. In the embodiment 10 it is preferred that the side members 14 and 16 be substantially planar and have substantially the same vertical height H between the top edges 20 and 22 and bottom edges 24 and 26, respectively, thereof.

A base member 28 is coupled to the side members 14 and 16 along vertically extending edges 30 and 32, respectively, and the side edges 30 and 32 are substantially parallel to the edge 18 and spaced therefrom by the width W. The base member 28 and side members 14 and 16 define an isosceles triangularly cross sectional bicycle storage cavity 34 therebetween.

A door means 36 is pivotally mounted, as described below in greater detail in connection with FIG. 3, to the base member 28 to define a bicycle accepting aperture 38 in the base member 28. Thus, the base member 28 defines a substantially rectangular frame having a top portion 40, a bottom portion 42, and side portions 44 and 46. The door means 36 may, for example, the pivotally mounted to the side portion 46 of the base member 28 along the edge 48 thereof by, for example, hinge means 50, shown in FIG. 3, coupled to the side portion 46 and the door means 36 interior the bicycle storage cavity 34 in order to prevent removal of the hinges when the door 36 is locked.

A pyramidical shaped top member 52 is coupled to the top edges 20 and 22 of side members 14 and 16, respectively, and to top edge 54 of top portion 40 of base member 28 to provide a top closure. The top member 52 has an apex 56 and, as shown more clearly in FIG. 2, a bicycle supporting hook means 58 is coupled to the apex 56 interior the bicycle storage cavity 34. The bicycle supporting hook means 58 utilized for hanging a bicycle, as indicated in dotted lines in FIG. 3 and designated by the numeral 60, in a vertical orientation in the bicycle storage cavity 34. The bicycle may be hung by, for example, its front wheel or rear wheel on the bicycle hook means 58.

Lock means 62 is provided for locking the door means 36 to the case means 12. Conventional coin operated locks may be utilized in the practice of the present invention. Such locks, of course, provide interlocking connection between side portion 44 of base member 28 to which the lock means 62 is coupled and the door means 36. In order to prevent surreptitious opening of the door 36 when it is locked, in preferred embodiments of the present invention, it is desired that the door means 36 also be locked to top portion 40 and/or bottom portion 42 of the base member 28 and thus provide additional safeguards for deterring or preventing the forced opening of the door means 36.

FIG. 4 illustrates one embodiment of such a structural arrangement for the lock means 62. FIG. 4 is an interior view of the door 36 and base member 28. As shown thereon the lock means 62 is provided with a tongue means 70 moving in reciprocating directions as indicated by the arrow 72. FIG. 4 illustrates the lock means 62 in the locking position wherein the tongue means 70 extends through a channel shaped clamp means 74 shown in section in FIG. 5, mounted on door means 36 and thus locks the door to the side portion 44. The tongue means 70 engages a pair of sliding bar members 76 and 78 slidingly mounted in channels 80, 82, 84 and 86 which, for example, may be similar to channel 74, and the bar members 76 and 78 move reciprocatingly on the interior of the door 36 in the direction indicated by the double ended arrow 88. In the locked position the tongue means 70 of the lock means 62 engages the bar members 76 and 78 and urges the bar member 76 upwardly into channel member 90 mounted on upper portion 40 of the case member 28. The channel 90 may be similar to the channel 74. The first spring means 92 extends between the bar members 76 and 78 for yieldingly urging the bar members 76 and 78 towards each other and second spring means 94 is mounted to the door means 36. Pivot arm 96 is pivotally mounted at 98 on the door member 36 and at 100 on the lower end of bar 78. Second spring 94 is coupled to pivot arm 96. Thus, when the tongue means 70 is retracted bar 76 is urged out of engagement with channel 90 and spring means 92 and 94 yieldingly urge the bar members 76 and 78 together to allow opening of the door 36.

As shown more clearly in FIG. 1, the case means 12 is supported above the ground a pre-selected distance indicated by the letter A by leg means 102, 104 and 106. The pre-selected distance A may be, for example, on the order of 2 to 5 inches or the like as required to allow maintenance and cleaning of the area beneath the case means 12. Further, the bottom of the case means 12, that is, between the edges 24 and 26 is left open in order to prevent the bicycle storage volume 34 from becoming a locked death trap for children or others who may inadvertently be locked therein.

In preferred embodiments of the present invention the height H of the pyramidical top member 52 is on the order of 10 inches. The side members 14 and 16, base member 28 and top 52 may be fabricated, for example of 16 or 18 gauge steel or the like. The overall height from the ground to the apex 56 may be on the order of 70 inches to 85 inches and the distance between the edge 18 and door means 36 may be on the order of 45 inches to 58 inches. The width of the door between side portions 44 and 46 may be on the order of 25 inches to 30 inches.

From the above it can be seen that there has been provided an improved bicycle storage cabinet in which a bicycle may be quickly and conveniently stored and locked to prevent theft thereof or the theft of component or accessory parts thereon. The storage cabinet utilizes a minimum of structure to provide the storage arrangement and occupies a minimum amount of ground space. By supporting the storage cabinet a predetermined distance above the ground rapid and convenient cleaning of the area beneath the storage cabinet may be accomplished.

Further, it will be appreciated, that a plurality of the storage cabinets described herein may be coupled together with common walls therebetween to provide a plurality of such storage cabinets.

The appended claims are appended to cover all variations and adaptations of the present invention now to be accorded the scope commensurate therewith.

I claim:
1. A bicycle storage locker for the storage of a bicycle in a vertical orientation and comprising, in combination:
    an open bottom, vertically extending case means having:
        a pair of side members intersecting at a first edge and having a pre-selected height between top edges and bottom edges thereof;
        a base member having a top edge and a bottom edge and coupled to said side members on second edges thereof spaced from said first edges, to define a bicycle storage cavity therebetween;
        a pyramidical top member coupled to said base member and said side members along the top edges thereof and having an apex at a pre-determined height above said top edges;
    a door means pivotally coupled to said base member to define a bicycle accepting aperture therethrough to allow passage of a bicycle into said storage cavity;
    bicycle supporting hook means coupled to said top member at said apex thereof and interior said storage cavity;
    lock means for locking said door means to said base member; and
    leg means for supporting said case means a predetermined distance from the ground, whereby a bicycle is supported in said bicycle storage cavity in a vertical orientation and having one of the front wheel and rear wheel mounted on said bicycle supporting hook means.
2. The arrangement defined in claim 1 wherein:
    said side members and said base member define an isosceles triangular cross section bicycle storage cavity.
3. The arrangement defined in claim 2 wherein:
    said top edges of said side members and said top edge of said base member are substantially coplanar.
4. The arrangement defined in claim 3 wherein:
    said second edges of said side members, said base member and said door means are substantially planar, and said base member comprises a substantially rectangular configuration surrounding said bicycle accepting aperture and having a top portion, a bottom portion and a pair of side portions.
5. The arrangement defined in claim 4 and further comprising:
    hinge means coupled to said door means and said base member interior said bicycle storage cavity to provide said pivotal mounting thereof.
6. The arrangement defined in claim 5 wherein said lock means comprises:
    bar means slideably mounted on said door means in said bicycle storage cavity for vertical reciprocating motion thereon for selective movement into locking engagement with at least one of said top portion and said bottom portion of said base member.
7. The arrangement defined in claim 6 wherein said lock means further comprises:
    said bar means comprises a pair of vertically aligned bar members, a first of said pair of bar members selectively moveable into locking engagement with said top portion of said base member;
    first spring means coupled to said pair of bar members for yieldingly urging said bar members together to yieldingly resist movement of said first bar member into said locking engagement;
    a tongue means mounted on said side portion of said frame member and selectively moveable from said side portion into bar moving engagement with at least said first bar member to urge said first bar member into said locking engagement with said top portion of said base member.
8. The arrangement defined in claim 7 wherein:
    said leg means support said case means in the range of 2 to 5 inches from the ground;
    said pre-determined height of said top member is approximately 10 inches.

* * * * *